United States Patent [19]
Sandberg

[11] Patent Number: 4,485,396
[45] Date of Patent: Nov. 27, 1984

[54] AUTOMATIC CHROMA FILTER

[75] Inventor: Edmund Sandberg, Redwood City, Calif.

[73] Assignee: Ampex Corporation, Redwood City, Calif.

[21] Appl. No.: 418,903

[22] Filed: Sep. 16, 1982

[51] Int. Cl.³ .................... H04N 9/493; H04N 9/535
[52] U.S. Cl. .................................. 358/27; 358/316; 358/36; 358/19
[58] Field of Search ............... 358/315, 316, 318, 327, 358/27, 36, 37, 21 R, 17, 19

[56] References Cited
U.S. PATENT DOCUMENTS

| | | | |
|---|---|---|---|
| 3,715,474 | 2/1973 | Calfee et al. | 358/315 |
| 3,717,721 | 2/1973 | Makara et al. | 358/316 |
| 4,447,826 | 5/1984 | Lewis et al. | 358/27 |

Primary Examiner—Michael A. Masinick
Attorney, Agent, or Firm—George B. Almeida; Joel D. Talcott

[57] ABSTRACT

An auto chroma filter averages the value of successive color burst amplitudes on a line-by-line basis over many video frames, by fetching a burst value from memory and loading it into an up/down counter, and also into a D/A converter which provides the chroma filter output signal. A comparator compares an incoming new burst value with the output signal, whereby the counter increments or decrements the value toward the incoming new burst value in response to the comparator. The updated value then is loaded back into memory in the same location from which it was fetched, and the cycle continues for each video line and successive frames.

16 Claims, 3 Drawing Figures

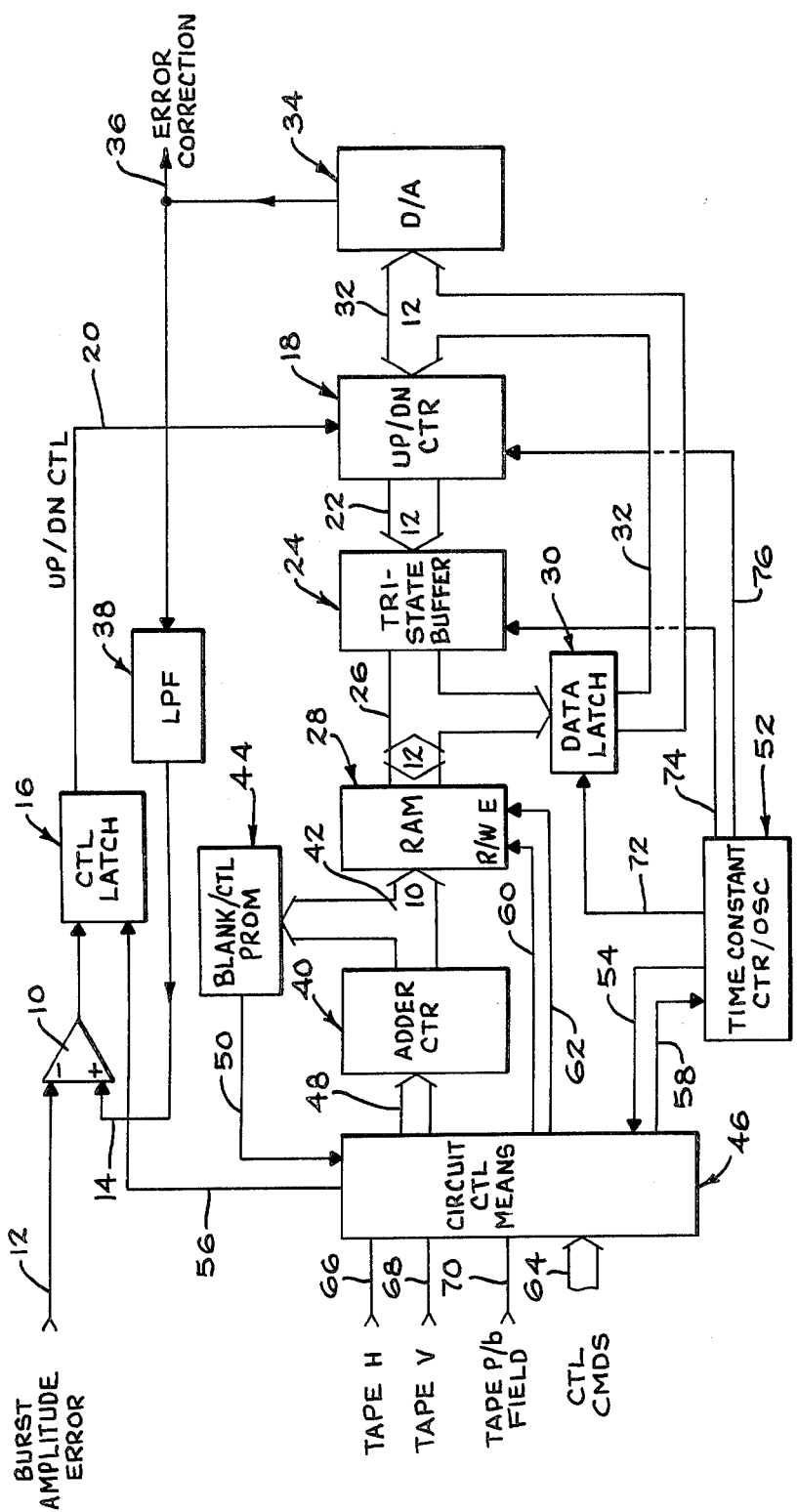
FIG_1

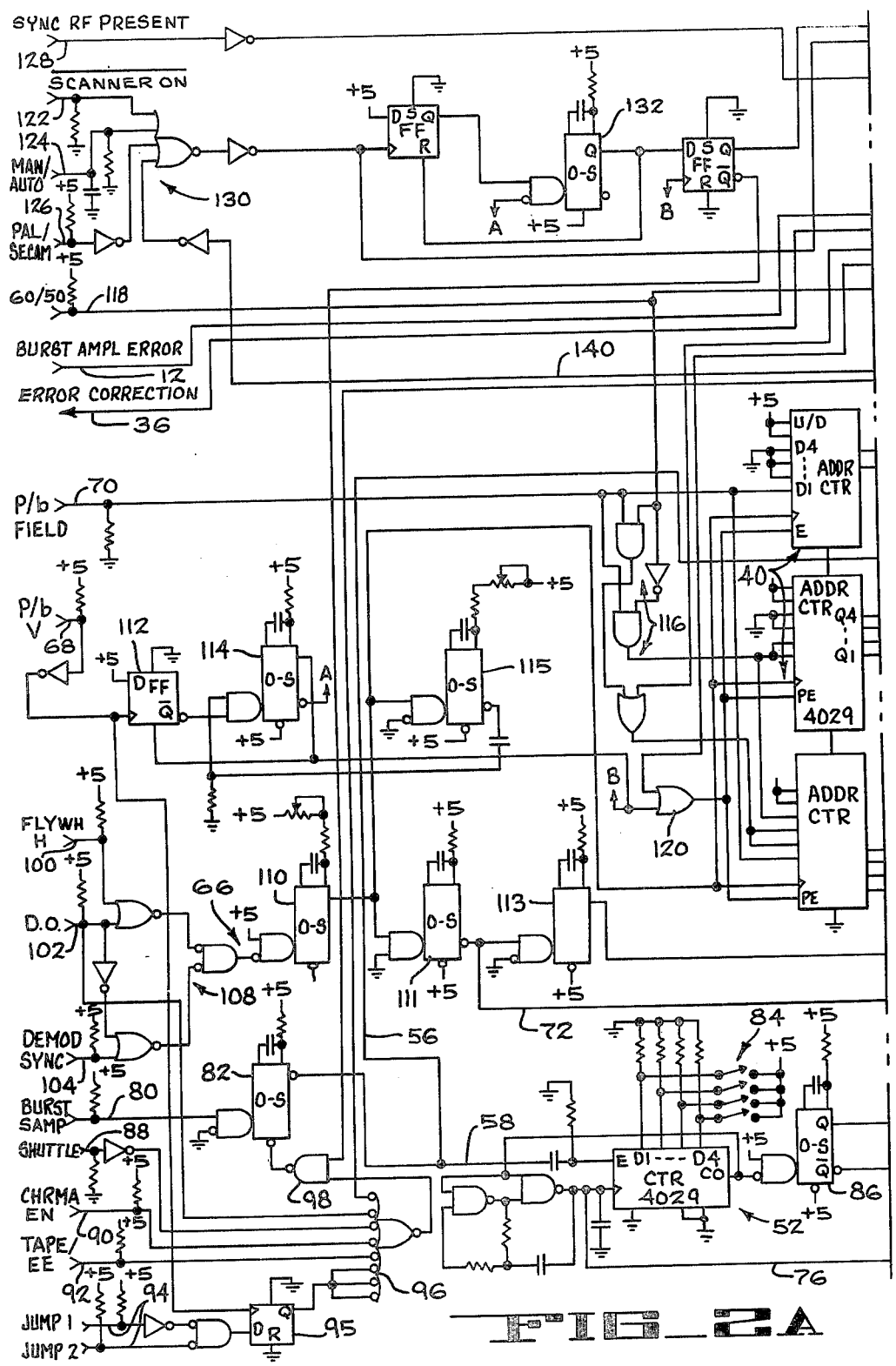

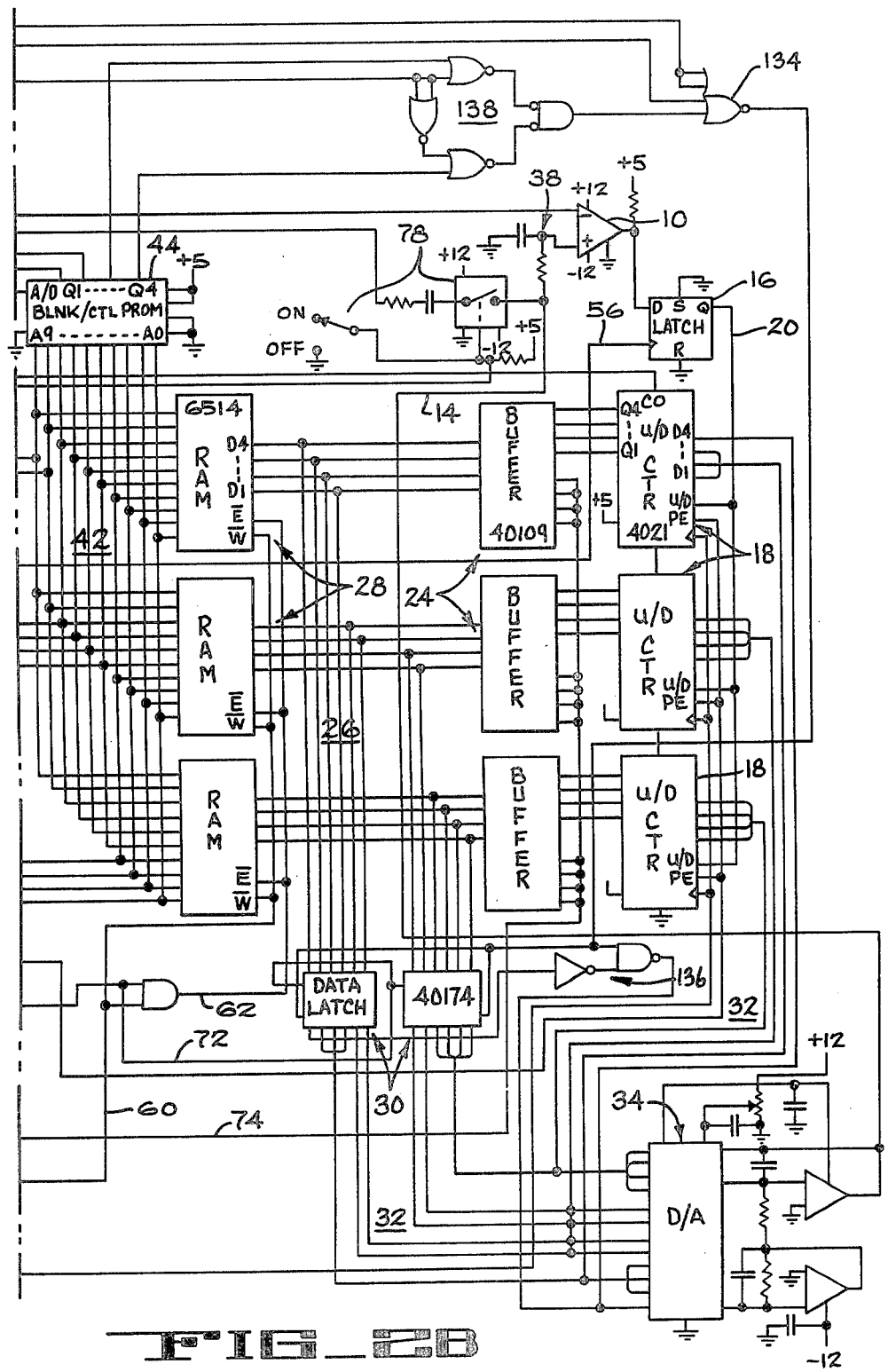
FIG_2B

AUTOMATIC CHROMA FILTER

BACKGROUND AND SUMMARY OF THE INVENTION

The present invention relates to auto chroma circuits, and particularly to a chroma filter circuit which detects and maintains an average DC value of chroma amplitude on every video line per frame, averaged over many frames.

Video production recorders such as those commonly known as helical scan recorders, utilize an equalizer circuit whose major function is to equalize radio frequency (RF) signals produced by the video and sync play heads, and then route the signals to a demodulator circuit in the recorder. The equalizing function removes errors that are generated by variations in head-to-tape contact, the position of the head with respect to a recorded track as in the case of a dithered playback head, scratches on the tape, etc. The error signals are reflected as a decrease in the level of the RF retrieved from the tape.

In addition, helical video tape recorders utilize an auto chroma system to measure the average DC value of the amplitude of a color burst signal. The signal is sent to the equalizer circuit which produces an average chroma amplitude signal via a servo loop to maintain the video bandwidth, i.e., to maintain as flat a frequency response as possible across a full field or frame of the video signal. Such chroma circuits typically detect the amplitude of a color burst at the beginning of a frame, and thereafter maintain the same error correction signal throughout the entire frame interval.

However, since the signal recovered from tape is very noisy due to the previously mentioned head-to-tape spacing variations, dropouts, etc., the average error signal detected over an entire frame interval is completely hidden in the noise. It follows that many variations in the signal level may occur during one frame that are not detectable by typical auto chroma circuits. That is, present auto chroma circuits fail to correct for small amplitude variations in the equalizer error signal off tape which occur in one or two lines of video.

The present invention overcomes the shortcomings of present auto chroma circuits by detecting and maintaining an average DC value of chroma amplitude on every video line during a frame interval, averaged over many frames. The resulting additional correction signal is added to the DC correction signal of the auto chroma filter systems.

To this end, the amplitude of every successive color burst is sampled and is supplied to a comparator along with the analog output of the auto chroma filter circuit. A random access memory stores the digital value of the burst amplitude of every horizontal line in a television frame. A digital value of color burst from a line is fetched from memory and is loaded into an up/down data counter, and also is fed to a digital-to-analog (D/A) converter to provide the analog output to the equalizer as well as to the comparator. The comparator compares the incoming input data with the previously averaged analog output from the D/A converter, and directs the up/down counter to increment or decrement its contents toward the input data value. The magnitude of the counter increment or decrement is determined by a time constant counter oscillator which selects the number of clock pulses that are used per burst sample that are supplied to the updating components. The updated value generated in the up/down counter is loaded back into memory at the same location from which the previous value was fetched. The newly stored data is then fetched again in the next frame.

Accordingly, it is an object of the present invention to provide an average DC value of chroma amplitude on every video line per frame averaged over many frames.

It is another object to compare, line by line, a color burst value stored in memory with an incoming color burst value in order to update the burst value prior to storage back in memory.

Another object is to provide the average DC value of color burst for every horizontal line in a video frame, by incrementing or decrementing a counter to cause an old value to approach a new incoming data value.

BRIEF DESCRIPTION OF THE DRAWINGS

FIG. 1 is a block diagram of an auto chroma filter.

FIGS. 2A–2B is a schematic diagram of an implementation of the block diagram of FIG. 1.

DESCRIPTION OF THE PREFERRED EMBODIMENTS

Referring to FIG. 1, a color burst amplitude error signal is supplied to an input 12, and corresponds to the consecutive sampling of each color burst amplitude of each line in a video frame. The error signal is detected and supplied to the negative input of a comparator 10 by means of amplitude modulation detector and sample/hold circuits (not shown) upstream of the chroma filter. Thus, the error signal on input 12 corresponds to the burst DC value for each line of horizontal video, wherein the burst values vary in accordance with succeeding detected color burst amplitudes.

The positive input of the comparator 10 is coupled to the output of the auto chroma filter via a line 14, as further described below. The output of the comparator is supplied to a control latch 16 which, in turn, supplies an up/down control signal to an up/down data counter 18 via a line 20.

The data counter 18 forms part of a data cycling loop, and supplies updated digital data via a bus 22 to a tri-state buffer 24. Buffer 24 is coupled via a tri-state bus 26 to a random access memory (RAM) 28, wherein the tri-state bus also extends to a data latch 30. Digital data is supplied from data latch 30 to the data counter 18 via a bus 32, and also to a digital-to-analog (D/A) converter 34. The D/A converter 34 supplies the analog error correction signal, as for example, to an equalizer circuit of the video tape recorder, via an output 36. The output of converter 34 is also fed back to the positive input of the comparator 10 via a low pass filter 38 and the line 14 of previous mention.

The components 18, 24, 28 and 30 form a data cycling loop which alternately stores and updates the burst data in the RAM 28 and data counter 18, for each line of video. The data counter increments or decrements a value in response to the comparator 10, i.e., the up/down control signal on line 20. By way of example only, the digital data is formed of 12 bit words.

The addresses for the data stored in RAM 28 are provided as 10 bit words via a memory line address counter 40 and an address bus 42. Bus 42 also is coupled to a blanking/control programmable read only memory (PROM) 44 which supplies blanking timing for the NTSC or PAL standard.

The address counter 40 is controlled by a circuit control means 46 via a control bus 48, wherein the means 46 receives inputs from the PROM 44 via line 50, and from a time constant counter oscillator 52 via a line 54. The control means 46 in turn supplies timing clocks to the control latch 16 via a line 56 and to the time constant counter oscillator 52 via a line 58, and also read/write and enable signals to the RAM 28 via respective lines 60, 62. The circuit control means 46 receives various control commands via a control command bus 64 as well as tape horizontal (H), vertical (V) and playback field signals via inputs 66, 68, 70 respectively. The time constant counter oscillator 52 supplies timing pulses to the data latch 30 via a line 72, the tri-state buffer 24 via a line 74, and the data counter 18 via a line 76.

Referring particularly to FIGS. 2A–2B as well as FIG. 1, wherein like components are similarly numbered, the color burst amplitude error signal is supplied to the negative input of the comparator 10. The error correction signal, comprising the output of the present auto chroma filter, is supplied on the output 36 via an on/off switch 78, and also is supplied to the comparator via the D/A converter 34, the low pass filter 38 and the line 14. The analog output from the D/A converter 34 appears as a DC level at the positive input of the comparator 10, which centers the range of the comparator. The comparator 10 makes a comparison between the input signal and the output signal, and generates an output indicative of whether the data counter 18 should count up or down in order to drive the level of the output towards that of the input signal. The control latch 16 holds the up/down control signal for the line period of interest. The control signal is supplied from the control latch 16 to the data counter 18 which, in response thereto, increments or decrements the stored digital word towards the input data value. The amount that the counter 18 increments is determined by the time constant counter oscillator 52, which provides means for varying the applied number of clock pulses per burst sample; i.e., for varying the averaging process time at the output of the D/A converter 34.

The resulting updated digital value is loaded back into the RAM 28 in the same location from which the prior digital value was fetched, as determined by the address counter 40. In the next cycle, which occurs in the subsequent frame, the newly stored data in the RAM 28 is fetched and captured in the data latch 30, during the very short time period it is on the tri-state bus 26. The data latch 30 holds the data for a whole line period, which allows the system to work on the data, i.e., allows the data to be fed back into the data counter 18 for updating in accordance with the up/down control signal from the comparator 10. Thus, the buffer 24 and data latch 30 provide means for placing and retrieving data on and off a tri-state bus from a one-way bus.

The memory line address counter 40 provides means for addressing the RAM 40 in either 525 or 625 locations, corresponding to the NTSC or PAL color broadcast standards respectively. The RAM 40 thus stores the 12 bit values of the color burst amplitudes for every horizontal line of a video frame. The PROM 44 is pre-programmed to provide blanking and control signals for either the NTSC or PAL standard, and is addressed via the address bus 42.

The circuit control means 46 of FIG. 1 is shown in FIG. 2A along the left side of the schematic, and supplies all timing and control signals required by the auto chroma filter, in response to various control signals and commands from the associated recorder system. Accordingly, a burst sample gate is supplied on line 80 and comprises the same burst gate that acquires the burst amplitude error signal on input 12. The burst sample gate is fed to a one-shot multivibrator 82, which provides a trigger to the time constant counter oscillator 52 of previous mention to initiate the various control pulses on lines 72, 74 and 76 therefrom. Thus the burst sample gate controls whether the auto chroma filter works on new data in memory, or just reloads and recycles the same data value.

The time constant oscillator 52 includes a thumbwheel switch 84 which provides values ranging from 0 to 15 which, in turn, direct the oscillator 52 to generate from 0 to 15 clock pulses. If the thumbwheel switch 84 is set on 0, the time constant oscillator is disabled, which freezes the data cycling loop of previous mention, causing it to cycle the same burst value. If the thumbwheel is set on a value from 1 through 15, the time constant oscillator 52 supplies the respective number of pulses 1 through 15 to a one shot 86. Thus a setting of 15 provides a very fast time constant, i.e., provides 15 increment or decrement pulses to the data counter 18 to cause it to rapidly increment or decrement the data therein towards the input data. In the event a noisy tape is to be played back, a lower time constant is desirable to enhance noise immunity; i.e., it is preferable to average the incoming color burst amplitude error signal over a longer period. However, when playing back a tape with low noise, the time constant is maximized to provide a shorter integration time with less noise immunity but with optimum circuit performance.

After the data counter 18 is updated, the one-shot 86 provides delayed control and write commands to the buffer 24 and RAM 28 respectively, via lines 74 and 60, to place the RAM in the write mode and to load the updated data into the RAM via the buffer 24.

The remaining inputs shown in the lower portion of the command bus 64, are go/don't-go commands to the auto chroma filter circuit. Thus the shuttle command on line 88, the auto chroma enable command on line 90, the tape/EE command on line 92 and the slow motion jump 1, jump 2 commands on lines 94, all provide commands via the D-type flip-flop 95, the NOR gate array 96 and the NAND gate 98, which disable triggering of the time constant counter oscillator 52 via the one-shot 82. The jump commands relate to the process of track jumping with an automatic scan tracking (dithered) head, when generating a field or frame of video in the slow motion mode. Thus, the jump commands open a window for a selected time period and then maintain the burst amplitude in the data cycling loop for a field or frame interval. The burst sample gate on line 80 re-establishes the normal data cycling.

On FIG. 2A, three inputs alternately supply the tape horizontal (H) timing control signal on line 66 of FIG. 1, which in turn sets up the address timing, enables the data counter 18 and RAM 28, and initalizes the burst sampling. To this end, there is provided a flywheeled H signal on a line 100, a dropout pulse signal on line 102 and a demodulator sync signal on line 104. Demodulator sync on line 104 is derived from a phase locked loop output from off tape, and is a horizontal sync related signal. Likewise, flywheeled H on line 100 is derived from the phase locked loop output and is an H sync related signal. The auto chroma filter circuit continuously is provided with the demodulator sync signal except in those instances where a dropout occurs off tape, and the demodulator sync signal is missing. Then the flywheeled H signal on line 100 is utilized, along with the dropout pulse signal on line 102, to provide the tape H input signal on line 66.

Thus the gates 108 act as a switch to supply one of the incoming H signals to a one-shot 110, which provides the exact timing for the various events throughout the auto chroma filter. To this end, one-shot 110 provides an H related clock pulse to clock a new address in the address counter 40, whereby the address is stepped to the next location in the RAM 28 prior to each cycle of data. The one-shot 110 also clocks the latch 30 via a one-shot 111 and the line 72, and supplies a port enable pulse to the data counter 18 via another one-shot 113.

The tape playback vertical (V) command on line 68 corresponds to V sync off tape and starts the system operation. The playback V is supplied to a pulse shaping circuit 112, and thence to a one-shot 114. The latter also is coupled to the H sync signal via a one-shot 115. The one-shot 114 is coupled to an input of an OR gate 120 which, along with an input from the control PROM 44, supplies the port enable inputs of the address counter 40.

The playback field signal on line 70 indicates whether the video signal is on an odd or even field within the frame. The signal is supplied to the various inputs of the address counter 40 via a series of gates 116. Thus the address counter 40 is set at, for example, 0 on an odd field, and digital number 263 on an even field (for the NTSC color standard).

The address counter 40 is also steered by a 60/50 Hz command via a line 118 in the control command bus 64 shown at the top of the schematic. The latter command is supplied to the series of gates 116 and sets up the appropriate timing for either the 525 NTSC or the 625 PAL color standard. It also is supplied to the blanking and control PROM 44 to provide blanking timing for either standard.

The remaining inputs in the control command bus 64 consist of a scanner-on command on a line 122, a manual/auto command on line 124, a PAL/SECAM command on line 126 and a sync RF present command on line 128. The inputs on lines 122–126, in combination with the following gates 130, provide switch means for handling commands from the system control, and essentially are commands which turn the auto chroma filter circuit on or off. Gates 130 are coupled to a frame one-shot 132 which, along with a pair of D-type flip-flops, provides a clear signal to the data latch 30 via a NOR gate 134, and to the D/A converter 34 via a gate 136 to center the D/A converter output. The latter signal holds for a frame cycle. The sync RF present command on line 128 determines whether there is sync or not and is fed to a NOR gate array 138, which provides one of the inputs to the NOR gate 134.

In a further adjunct function of the control means 46, in the event of a severe overload in the system, a carry-over is provided from the data counter 18 to the NOR gate 130 via a line 140. This provides the signal to clear the RAM 28 and the data latch 30, center the D/A converter 34, etc., to start the next burst sample cycle with a flat baseline. This prevents video picture breakup due to over-correction by the equalizer circuit coupled to output 36.

What is claimed is:
1. A circuit for maintaining an average DC color burst value as an output signal comprising:
    memory means for selectively storing color burst values from horizontal video lines and for supplying the values as the output signal;
    comparator means for generating an up/down control signal indicative of the relative values of an incoming color burst and the output signal;
    counter means responsive to the comparator means for updating the output signal towards the incoming color burst value and loading the updated color burst values back in memory means; and
    control means coupled to the memory means and to the counter means for cycling the values therebetween.
2. The circuit of claim 1 including:
    means for determining the addresses of the color burst values stored in the memory means, in response to the control means.
3. The circuit of claim 2 wherein:
    a color burst value for each horizontal line in a frame is stored in the memory means; and
    said counter means updates a color burst value corresponding to the output signal during each successive horizontal video line in response to the comparator means as directed by the control means.
4. The circuit of claim 3 including:
    D/A converter means operatively coupled to the memory means for generating the output signal from a previously stored color burst in the memory means; and
    wherein said comparator means compares the incoming color burst value to the output signal from the D/A converter means.
5. The circuit of claim 4 further including:
    time constant control means integral with said control means for supplying clock pulses of different frequency rates to the counter means to vary the rate of the updating.
6. The circuit of claim 4 further including:
    data latch means coupled to the memory means for latching the previously stored color burst for a selected line period; and
    buffer means for coupling the counter means to the memory means.
7. The circuit of claim 6 further including:
    control latch means for latching the up/down control signal for a selected line period.
8. The circuit of claim 4 wherein:
    said memory means is a random access memory;
    said counter means is an up/down counter; and
    said means for addressing is an address counter responsive to the control means.
9. The circuit of claim 4 further including:
    a programmable read only memory coupled to the means for addressing, for supplying circuit blanking commensurate with the color television standard.
10. A circuit for supplying an average DC color burst value over multiple video lines, comprising:
    memory means for storing color burst values from successive horizontal video lines;
    D/A converter means coupled to the memory means for generating an output signal corresponding to a stored color burst signal;

comparator means for generating an up/down control signal indicative of the relative values of an incoming color burst and the output signal;

up/down counter means for updating the stored color burst value from the memory means towards the incoming color burst value in response to the comparator means; and means for storing the updated color burst value back into the memory means.

11. The circuit of claim 10 further including:

control means coupled to the memory and up/down counter means for cycling the color burst values therebetween; and address means responsive to the control means for storing the color burst value back in the memory means at the same locations therein from which the previously stored value was fetched.

12. The circuit of claim 11 further including:

data latch means for coupling the memory means to the D/A converter means in response to the control means; and buffer means for coupling the up/down counter means to the memory means in response to the control means.

13. The circuit of claim 11 wherein the control means include:

time constant control means for clocking the up/down counter means at different clocking rates.

14. The circuit of claim 11 wherein the control means include:

means for supplying an off tape vertical sync related signal for initiating circuit operation; and means for supplying an off tape horizontal sync related signal for clocking and enabling the address means, the memory means and the up/down counter means.

15. The circuit of claim 11 further including:

means for resetting the D/A converter means and for clearing previous color burst data in the event of an overload, in response to a carryover signal from the up/down counter means.

16. The circuit of claim 11 further including:

jump circuit means integral with the control means for selectively freezing the color burst value which is cycled during a field or frame in response to a slow motion mode input.

* * * * *